United States Patent
Girgensohn

(10) Patent No.: US 10,504,002 B2
(45) Date of Patent: Dec. 10, 2019

(54) SYSTEMS AND METHODS FOR CLUSTERING OF NEAR-DUPLICATE IMAGES IN VERY LARGE IMAGE COLLECTIONS

(71) Applicant: FUJI XEROX CO., LTD., Tokyo (JP)

(72) Inventor: Andreas Girgensohn, Palo Alto, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 82 days.

(21) Appl. No.: 15/663,815

(22) Filed: Jul. 30, 2017

(65) Prior Publication Data

US 2019/0034758 A1 Jan. 31, 2019

(51) Int. Cl.
G06K 9/62 (2006.01)
G06K 9/46 (2006.01)
G06F 16/55 (2019.01)

(52) U.S. Cl.
CPC ........... G06K 9/6215 (2013.01); G06F 16/55 (2019.01); G06K 9/4642 (2013.01); G06K 9/4671 (2013.01); G06K 9/4676 (2013.01); G06K 9/6219 (2013.01); G06K 9/6267 (2013.01)

(58) Field of Classification Search
None
See application file for complete search history.

(56) References Cited

U.S. PATENT DOCUMENTS

| | | | |
|---|---|---|---|
| 6,711,293 B1 | 3/2004 | Lowe | |
| 8,805,117 B2 | 8/2014 | Liu et al. | |
| 2013/0273968 A1* | 10/2013 | Rhoads | G06K 9/6253 455/556.1 |
| 2016/0042253 A1* | 2/2016 | Sawhney | G06F 16/50 382/190 |

(Continued)

OTHER PUBLICATIONS

Jun Jie Foo, Justin Zobel, Ranjan Sinha. Clustering near-duplicate images in large collections. Proceedings of the international workshop on multimedia information retrieval, pp. 21-30, 2007.

(Continued)

*Primary Examiner* — Idowu O Osifade
(74) *Attorney, Agent, or Firm* — Procopio, Cory, Hargreaves & Savitch LLP

(57) ABSTRACT

Detection of near-duplicate images is important for detecting the reuse of copyrighted material. Some applications require the clustering of near-duplicates instead of the comparison to an original. Representing images as bags of visual words is the first step for our clustering approach. An inverted index points from visual words to all the images containing that visual word. In the next step, matches are geometrically verified in pairs of images that share a large fraction of their visual words. Geometric verification may use affine, perspective, or other transformations. The verification step provides a similarity measure based on the fraction of the matching image points and on their distributions in the compared images. The resulting distance matrix is very sparse because most images in the collection are not (Continued)

compared to each other. This distance matrix is used as input for modified agglomerative hierarchical clustering approach that can handle a sparse distance matrix.

24 Claims, 3 Drawing Sheets

(56) References Cited

U.S. PATENT DOCUMENTS

2016/0048536 A1* 2/2016 Di .................. G06F 16/583
382/165

OTHER PUBLICATIONS

Stephanie Pancoast, Murat Akbacak. Bag-of-Audio-Words Approach for Multimedia Event Classification. https://www.researchgate.net/profile/Stephanie_Pancoast/publication/266057170_Bag-of-Audio-Words_Approach_for_Multimedia_Event_Classification/links/551953740cf2d241f3563352.pdf.

Stephanie Pancoast, Murat Akbacak. Softening Quantization in Bag-of-Audio-Words. 2014 IEEE International Conference on Acoustics, Speech and Signal Processing (ICASSP), May 4-9, 2014, Florence, Italy.

Jean-Julien Aucouturier, Boris Defreville, Francois Pachet. The Bag-of-frames Approach to Audio Pattern Recognition: A Sufficient Model for Urban Soundscapes but Not for Polyphonic Music. The Journal of the Acoustical Society of America 122, 881 (2007).

* cited by examiner

SYSTEMS AND METHODS FOR CLUSTERING OF NEAR-DUPLICATE IMAGES IN VERY LARGE IMAGE COLLECTIONS

BACKGROUND OF THE INVENTION

Technical Field

The disclosed embodiments relate in general to techniques for computerized image analysis, processing and matching and, more specifically, to systems and methods for clustering of near-duplicate images in very large image collections.

Description of the Related Art

When copying physical copyrighted material such as books and magazines, the copied image is somewhat close to the original, but may have minor imperfections due to the finite resolution of the copier, image rotation, and smudges. In the case of books, two pages may be copied at the same time and bending the spine may cause distortions of the resulting image. While the direct comparison to the original is a main part of identifying the copyrighted material, there is also a need to cluster different copies of the same material for later examination. Clustering also helps with demonstrating the effectiveness of the image matching approach.

The image clustering approaches known in the art fall into two broad categories: top-down partitioning approaches, such as k-means clustering, or bottom-up hierarchical approaches, such as agglomerative hierarchical clustering. The aforesaid top-down approaches tend to use a centroid in a vector space to partition the space. On the other hand, a bag of visual words approach, well known to persons of ordinary skill in the art, is used for image classification, by treating image features as words. According to the aforesaid bag of words approach, a vector of occurrence counts of a vocabulary (e.g. collection) of local image features (e.g. a sparse histogram over the image feature collection) is built and subsequently used in image classification. Unfortunately, the bag of words techniques using a large vocabulary (e.g., more than 100,000 words) are not well suited for the aforesaid top-down partitioning approaches.

In contrast, bottom-up approaches have a space complexity of $O(n^2)$ for the distance matrix and possibly other data structures and a time complexity of at least $O(n^2)$. With millions of documents ($10^6$) to be clustered, both the space and time complexity is of the order of trillions ($10^{12}$). For example, if one thousand documents are clustered in one second, one million documents would be clustered in about 300 hours. Even the space complexity pushes the limits of current computer systems because even a one byte distance would require one terabyte random access memory (RAM) for one trillion pairs. On the other hand, distances are represented by multiple bytes, which lead to even higher memory requirements.

In view of the aforesaid shortcomings of the conventional image clustering technology, there is a strong need in the art for solutions to the image clustering problem providing for efficient clustering of image collections containing millions of images.

SUMMARY OF THE INVENTION

The embodiments described herein are directed to methods and systems that substantially obviate one or more of the above and other problems associated with conventional technology for image clustering.

In accordance with one aspect of the inventive concepts described herein, there is provided a computer-implemented method for clustering a plurality of images, the computer-implemented method being performed in connection with a computerized system incorporating at least a central processing unit and a memory, the computer-implemented method involving: generating a vocabulary of visual words in the plurality of images; extracting image features for image key points for each of the plurality of images; based on the extracted image features, creating an index pointing from the visual words in the vocabulary to images from the plurality of images, which contain these visual words; using the created index to collect all other images of the plurality of images that share at least one visual word with a selected image and determining a number of shared visual words; performing a geometric verification to verify whether the shared visual words are located at same locations in the selected image and the other images of the plurality of images and taking a fraction of verified shared visual words to all shared visual words as a similarity measure; and clustering the plurality of images hierarchically based on the similarity measure.

In one or more embodiments, the vocabulary of visual words is generated from a set of image features extracted from a collection of representative images.

In one or more embodiments, the collection of representative images comprises at least one million images.

In one or more embodiments, generating the vocabulary of visual words comprises clustering similar feature vectors and representing all feature vectors similar to each cluster centroid with a visual word and adding that visual word to the vocabulary of visual words for each cluster.

In one or more embodiments, wherein the image features for image key points are extracted for the each of the plurality of images using a scale-invariant feature transform (SIFT).

In one or more embodiments, the index pointing from the visual words in the vocabulary to images from the plurality of images is an inverted index.

In one or more embodiments, the method further involves sorting the collected other images of the plurality of images that share at least one visual word with a selected image based on the number of the shared visual words.

In one or more embodiments, the method further involves selecting a predetermined number of the collected other images with top numbers of the shared visual words.

In one or more embodiments, performing the geometric verification comprises determining an affine transformation that maps at least a portion of the selected image to another image of the plurality of images.

In one or more embodiments, performing the geometric verification comprises determining a perspective transformation that maps at least a portion of the selected image to another image of the plurality of images.

In one or more embodiments, the method further involves verifying uniformity of distribution of the shared visual words over the other images and rejecting the other images with uniformity of distribution of the shared visual words below a predetermined threshold.

In one or more embodiments, verifying uniformity of distribution of the shared visual words over the other images comprises dividing the other images into a coarse two-dimensional grid comprising a plurality of cells, and for each grid cell, determining a fraction of matching visual words to the total visual words in that cell, and performing a statistical test for sufficient uniformity of the distribution of the shared visual words among the grid cells.

In one or more embodiments, clustering the plurality of images is performed using a modified complete-linkage agglomerative hierarchical clustering algorithm.

In one or more embodiments, the clustering the plurality of images is performed using a sparse distance matrix calculated based on the similarity measure.

In accordance with another aspect of the inventive concepts described herein, there is provided a computerized system for clustering a plurality of images, the computerized system incorporating a central processing unit and a memory storing a set of computer-executable instructions for: generating a vocabulary of visual words in the plurality of images; extracting image features for image key points for each of the plurality of images; based on the extracted image features, creating an index pointing from the visual words in the vocabulary to images from the plurality of images, which contain these visual words; using the created index to collect all other images of the plurality of images that share at least one visual word with a selected image and determining a number of shared visual words; performing a geometric verification to verify whether the shared visual words are located at same locations in the selected image and the other images of the plurality of images and taking a fraction of verified shared visual words to all shared visual words as a similarity measure; and clustering the plurality of images hierarchically based on the similarity measure.

In accordance with yet another aspect of the inventive concepts described herein, there is provided a non-transitory computer-readable medium embodying a set of computer-executable instructions, which, when executed in a computerized system incorporating a central processing unit and a memory, cause the computerized system to perform a method for clustering a plurality of images, the method involving: generating a vocabulary of visual words in the plurality of images; extracting image features for image key points for each of the plurality of images; based on the extracted image features, creating an index pointing from the visual words in the vocabulary to images from the plurality of images, which contain these visual words; using the created index to collect all other images of the plurality of images that share at least one visual word with a selected image and determining a number of shared visual words; performing a geometric verification to verify whether the shared visual words are located at same locations in the selected image and the other images of the plurality of images and taking a fraction of verified shared visual words to all shared visual words as a similarity measure; and clustering the plurality of images hierarchically based on the similarity measure.

In accordance with yet another aspect of the inventive concepts described herein, there is provided a computer-implemented method for clustering a plurality of content items, the computer-implemented method being performed in connection with a computerized system incorporating a central processing unit and a memory, the computer-implemented method involving: generating a vocabulary of words in the plurality of content items; extracting features from the plurality of content items; based on the extracted features, creating an index pointing from the words in the vocabulary to content items from the plurality of content items, which contain these words; using the created index to collect all other content items of the plurality of content items that share at least one word with a selected content item and determining a number of shared words; performing a content verification to verify whether the shared words are located at same locations in the selected content item and the other content items of the plurality of content items and taking a fraction of verified shared words to all shared words as a similarity measure; and clustering the plurality of content items hierarchically based on the similarity measure.

In one or more embodiments, the content items in the plurality of content items are texts.

In one or more embodiments, the content items in the plurality of content items are audio recordings.

In one or more embodiments, the content items in the plurality of content items are videos.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general-purpose computer, in the form of a specialized hardware, or combination of software and hardware.

In accordance with one aspect of the embodiments described herein, there is provided a computerized system and a computer-implemented method for image clustering that uses a bag of visual words representation and an inverted index to keep image clustering feasible even for millions of analyzed documents. As stated above, the aforesaid term "visual words" used herein refers to various image features, which are treated similar to words appearing in text documents.

In one or more embodiments, the described system checks, in parallel, the bag of visual words for each document. For each visual word in the bag, it determines all other documents that contain the same visual word, only considering documents that have a higher rank in an arbitrarily established order. While collecting the other documents, the system increases counters representing the number of visual words that the source document shares with each of the collected documents. The list of pairs of document identifier and matching word count is sorted by decreasing count and the first N pairs, where N is a natural number, are kept where N is the parameter representing the maximum count of cluster members. The system performs a geometric verification of the source document against each of the remaining documents. The fraction of verified key points to the total key points is the similarity measure. A threshold for the similarity measure removes all documents with an insufficient match. Because the threshold for matching documents has to be low to handle copies of low quality, an additional step prevents higher quality copies from matching only part of a document while still exceeding the match threshold. The resulting similarity measure is used as input for modified agglomerative hierarchical clustering approach that can handle a sparse distance matrix and performs the clustering of the images in the document collection based on the aforesaid similarity measure.

Figure 1:
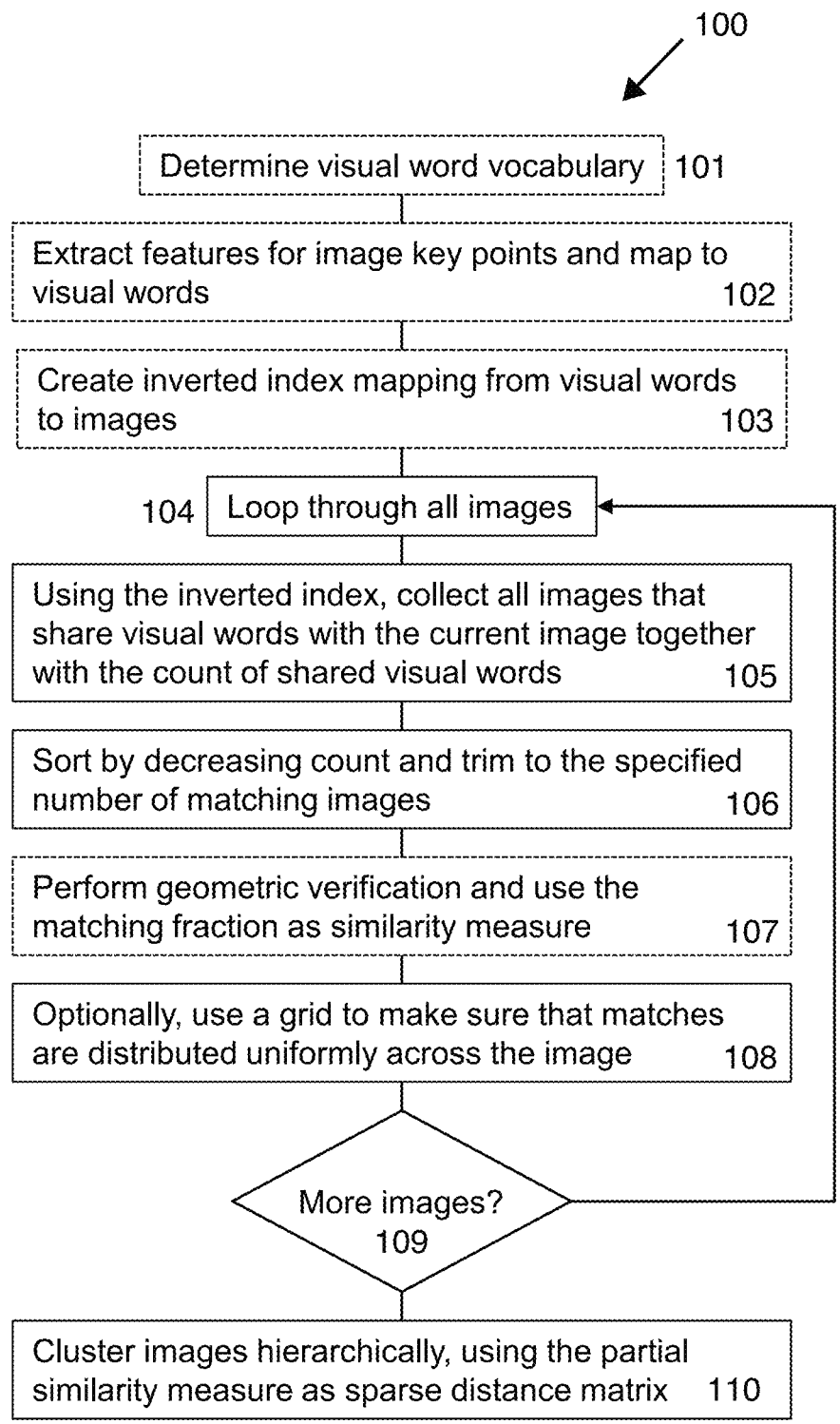
FIG. 1 illustrates an exemplary flow chart 100 of an embodiment of the described computerized image clustering method.

FIG. 1 illustrates an exemplary flow chart 100 of an embodiment of the described computerized image clustering method. In one or more embodiments, the key points in the document images are represented using well-known image features, such as local image features detected and described using a scale-invariant feature transform (SIFT) algorithm, well known in the art and described, for example, in U.S. Pat. No. 6,711,293. In one or more embodiments, a vocabulary of visual words is subsequently trained from a set of image features extracted from a sufficiently large collection of representative images, see step 101 in FIG. 1. In one or more embodiments, the collection of representative images used in the vocabulary generation comprises at least one million images.

In accordance with the conventional technique, the visual words vocabulary generation is performed with a clustering approach that clusters similar feature vectors and represents all feature vectors similar to the cluster centroid with the cluster identifier, the visual word.

In one or more embodiments, for all the images in the document image collection to be clustered, key points with features are extracted from the images using, for example, the aforesaid SIFT algorithm, see step 102 in FIG. 1. In one or more embodiments, the aforesaid image key points are distinctive feature points in the input images which are invariant, for example, to rotation, scale and distortion. In this step 102, each extracted image key point is represented by a visual word from the vocabulary determined by the aforesaid earlier training step 101.

Subsequently, at step 103 in FIG. 1, an inverted index is generated that points from each visual word in the generated visual word vocabulary to all the images containing this visual word one or more times.

Subsequent steps are performed in a loop through all of the images in the collection, the aforesaid image loop being implemented by means of steps 104 and 109. At step 105, images containing the same visual words as the current image are located via the aforesaid inverted index, and the number of the shared visual words is counted. At step 106, the located images sharing the same visual words with the current image are sorted by decreasing count of the matching visual words. After that, a predetermined number of top matching images are selected and the remaining images are trimmed.

At a subsequent step 107, a geometric verification process is performed, which verifies whether the matching visual words are located are the same location(s) in the compared images while allowing for transformations such as an affine transformation, perspective transformation or other suitable transformations. As would be appreciated by persons of ordinary skill in the art, the present invention is not limited to any specific types of transformations used in the geometric verification process. In one embodiment, an approach described, for example, in U.S. Pat. No. 8,805,117 may be used for this purpose. The fraction of the verified key points to the total key points is then taken as a similarity measure between images. In one or more embodiments, a threshold for the similarity measure is then used to remove all document images with an insufficient match.

In one or more embodiments, at step 108, the document image is divided into a coarse two-dimensional grid. For each grid cell, the fraction of matching key points to the total key points in that cell is determined. A statistical test for sufficient uniformity is performed and documents with an insufficiently uniform distribution of the matching key points are rejected. This additional step 108 is only required if low quality copies are a concern, requiring a low match threshold.

Finally, at step 110, the described embodiment clusters images using the results of the steps described above. In one embodiment, the system accepts a parameter representing the maximum count of cluster members, for example, 200. As would be appreciated by persons of ordinary skill in the art, larger numbers increase the time necessary to perform the computation. As would be also appreciated by persons of ordinary skill in the art, the invention is not limited to any specific maximum number of cluster members and any suitable number of such members may be used.

Specifically, in one or more embodiments, once similarities between document pairs have been determined, a modified complete-linkage agglomerative hierarchical clustering algorithm is applied. The modification deals with the sparse distance matrix due to the fact that geometric verification was only applied to a very small fraction of all possible document pairs and that some of those matches were rejected due to insufficient uniformity of the distribution of matching key points. Also, as discussed earlier, a complete distance matrix has a space complexity of $O(n^2)$, making it too large for the number of documents that should be clustered.

Similarly to the complete agglomerative hierarchical clustering algorithm, well known in the art, in one or more embodiments, the algorithm starts with a queue of document pairs ordered by the pair distance. However, only the pairs that have a match are included in the queue, making it much smaller than the queue of the complete clustering algorithm. In the clustering algorithm, all document pairs with undetermined similarity are considered to have a distance of infinity. Clusters where any pair of members has a distance of infinity cannot be merged.

Unlike the traditional hierarchical clusters, where the complete cluster tree only has a single root and clusters are selected with a cut through the tree, the described approach produces a forest of cluster trees where every tree represents a cluster and the leaf nodes are the cluster members. Because all mismatches are represented as a distance of infinity, there is no need to further subdivide any cluster trees in the forest.

Figure 2:
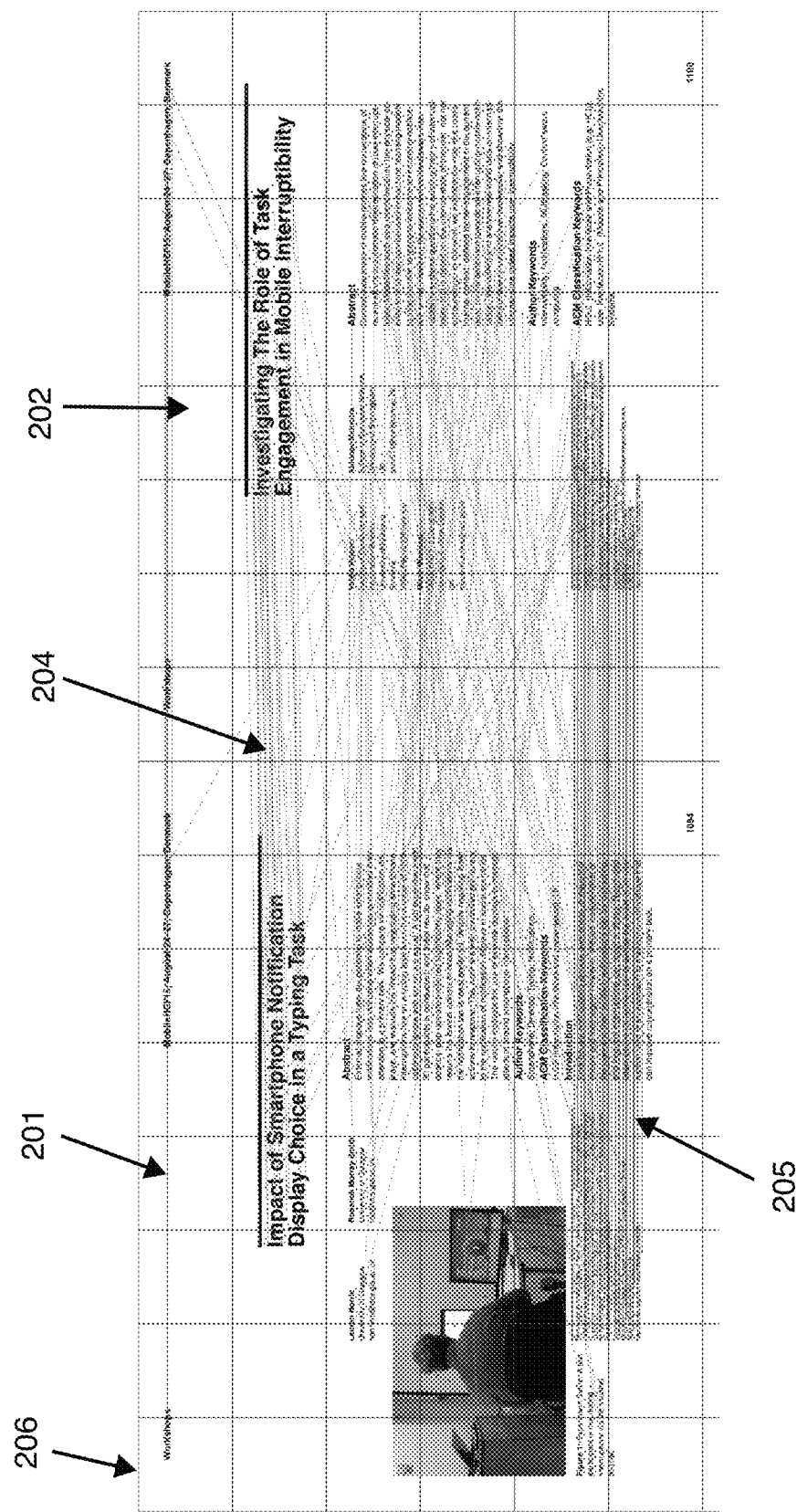
FIG. 2 illustrates matching two exemplary pages in accordance with an exemplary embodiment of the described techniques.

FIG. 2 illustrates matching two exemplary pages 201 and 202 in accordance with an exemplary embodiment of the described techniques. In FIG. 2, dots 203 represent the detected key points. Solid lines 204 connect similar key points, dashed lines 205 indicate geometric verification. The grid 206 is used to check uniformity of the fraction of matching key points.

As would be appreciated by persons of ordinary skill in the art, while the described technique is aimed at the comparison of images represented by visual words, it is also applicable in other bag-of-words domains that require an additional verification step. For example, when clustering text documents based on how many sentences they share, the bag-of-words for each document would be used in the first step. For documents that share many words, sentences would be compared.

In one or more exemplary embodiments, the described system is implemented in C++ and Java, both of which are well-known in the art. An exemplary embodiment fully utilizes a large number of CPU cores. On a system with 28 CPU cores, it can cluster 1.35 million images in about 15 minutes, not counting the time to determine feature key points or creating the inverted index.

In one or more embodiments, single-linkage clustering produced unsatisfying results in experiments. For example, it may merge the clusters A, B and C, D if B is similar to C, meaning that only A is similar to B, B similar to C, and C similar to D. With the relaxed matching required to deal with low-quality copies, this may produce clusters where A and D are not very similar to each other. In contrast, complete-linkage clustering uses the maximum distance of the elements of the merged clusters as the diameter of the merged cluster such that A being dissimilar to D would cause a large cluster diameter that would not be merged.

It should be further noted that the techniques described hereinabove are applicable not only to clustering of images, but also to clustering of other items of content, including, without limitation, text, video, and audio. For such other items of content, the bag of words described above is generated using a technique appropriate to a specific type of the items of content based on their respective features. For example, in case of clustering of textual content, the bag of words would include words in the text, while the verification step would perform a comparison of sentences in a text document. Similarly, the bag of words in an audio content situation would include separate sounds from the audio recording. Accordingly, as would be appreciated by persons of ordinary skill in the art, the described techniques are not limited to clustering of images, but also applicable to a variety of other types of content.

Figure 3:
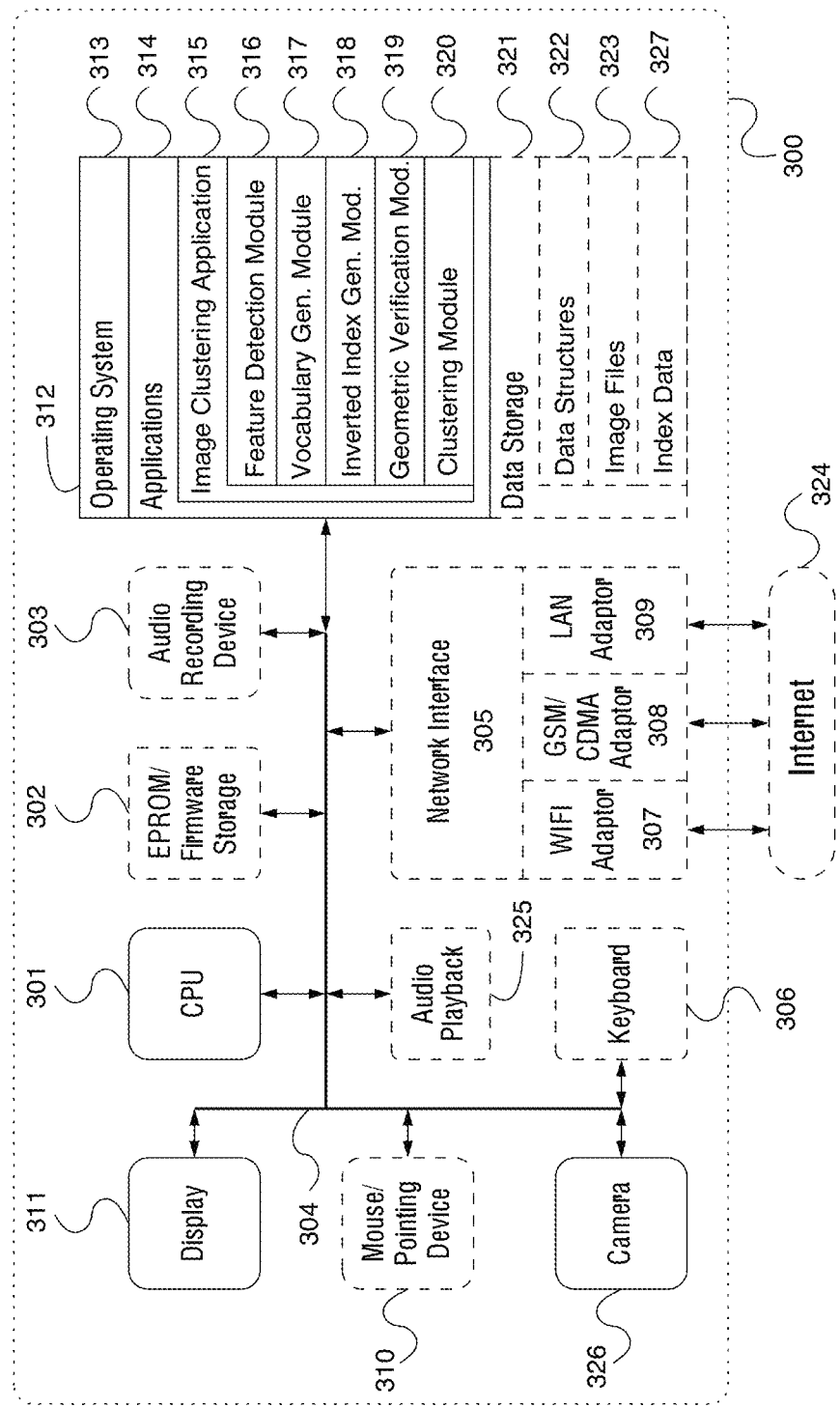
FIG. 3 illustrates an exemplary embodiment of a computerized system for image clustering that uses a bag of visual words representation and an inverted index to keep image clustering feasible even for millions of analyzed documents.

FIG. 3 illustrates an exemplary embodiment of a computerized system 300 for image clustering that uses a bag of visual words representation and an inverted index to keep image clustering feasible even for millions of analyzed documents. In one or more embodiments, the computerized system 300 may be implemented within the form factor of a desktop computer well known to persons of skill in the art. In an alternative embodiment, the computerized system 300 may be implemented based on a laptop or a notebook computer or any other mobile computing device, such as a smartphone or a tablet computer.

The computerized system 300 may include a data bus 304 or other interconnect or communication mechanism for communicating information across and among various hardware components of the computerized system 300, and a central processing unit (CPU or simply processor) 301 electrically coupled with the data bus 304 for processing information and performing other computational and control tasks. Computerized system 300 also includes a memory 312, such as a random access memory (RAM) or other dynamic storage device, coupled to the data bus 304 for storing various information as well as instructions to be executed by the processor 301. The memory 312 may also include persistent storage devices, such as a magnetic disk, optical disk, solid-state flash memory device or other non-volatile solid-state storage devices.

In one or more embodiments, the memory 312 may also be used for storing temporary variables or other intermediate information during execution of instructions by the processor 301. Optionally, computerized system 300 may further include a read only memory (ROM or EPROM) 302 or other static storage device coupled to the data bus 304 for storing static information and instructions for the processor 301, such as firmware necessary for the operation of the computerized system 300, basic input-output system (BIOS), as well as various configuration parameters of the computerized system 300.

In one or more embodiments, the computerized system 300 may incorporate a display device 311, which may be also electrically coupled to the data bus 304, for displaying various information to a user of the computerized system 300, such as the user interfaces showing the clustered document images as described herein. In an alternative embodiment, the display device 311 may be associated with a graphics controller and/or graphics processor (not shown). The display device 311 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 311 may be incorporated into the same general enclosure with the remaining components of the computerized system 300. In an alternative embodiment, the display device 311 may be positioned outside of such enclosure, such as on the surface of a table or a desk. In one or more embodiments, the computerized system 300 may further incorporate an audio capture device 303, such as a microphone.

In one or more embodiments, the computerized system 300 may further incorporate an audio playback device 325 electrically connected to the data bus 304 and configured to play various audio files, such as MPEG-3 files, or audio tracks of various video files, such as MPEG-4 files, well known to persons of ordinary skill in the art. To this end, the computerized system 300 may also incorporate waive or sound processor or a similar device (not shown).

In one or more embodiments, the computerized system 300 may incorporate one or more input devices, such as a mouse/pointing device 310, such as a mouse, a trackball, a touchpad, or cursor direction keys for communicating direction information and command selections to the processor 301 and for controlling cursor movement on the display 311. This input device typically has two degrees of freedom in two axes, a first axis (e.g., x) and a second axis (e.g., y), that allows the device to specify positions in a plane.

The computerized system 300 may further incorporate a camera 326 for acquiring still images and video of various objects, including the document images described herein, as well as a keyboard 306, which all may be coupled to the data bus 304 for communicating information, including, without limitation, images and video, as well as user commands (including gestures) to the processor 301.

In one or more embodiments, the computerized system 300 may additionally include a communication interface, such as a network interface 305 coupled to the data bus 304. The network interface 305 may be configured to establish a connection between the computerized system 300 and the Internet 324 using at least one of a WIFI interface 307, a cellular network (GSM or CDMA) adaptor 308 and/or local area network (LAN) adaptor 309. The network interface 305 may be configured to enable a two-way data communication between the computerized system 300 and the Internet 324. The WIFI adaptor 307 may operate in compliance with 802.11a, 802.11b, 802.11g and/or 802.11n protocols as well as Bluetooth protocol well known to persons of ordinary skill in the art. The LAN adaptor 309 of the computerized system 300 may be implemented, for example, using an integrated services digital network (ISDN) card or a modem to provide a data communication connection to a corresponding type of telephone line, which is interfaced with the Internet 324 using Internet service provider's hardware (not shown). As another example, the LAN adaptor 309 may be a local area network interface card (LAN NIC) to provide a data communication connection to a compatible LAN and the Internet 324. In an exemplary implementation, the WIFI adaptor 307, the cellular network (GSM or CDMA) adaptor 308 and/or the LAN adaptor 309 send and receive electrical or electromagnetic signals that carry digital data streams representing various types of information.

In one or more embodiments, the Internet 324 typically provides data communication through one or more sub-networks to other network resources. Thus, the computerized system 300 is capable of accessing a variety of network resources located anywhere on the Internet 324, such as remote media servers, web servers, other content servers as well as other network data storage resources. In one or more embodiments, the computerized system 300 is configured to send and receive messages, media and other data, including application program code, through a variety of network(s) including the Internet 324 by means of the network interface 305. In the Internet example, when the computerized system 300 acts as a network client, it may request code or data for an application program executing on the computerized system 300. Similarly, it may send various data or computer code to other network resources.

In one or more embodiments, the functionality described herein is implemented by computerized system 300 in response to processor 301 executing one or more sequences of one or more instructions contained in the memory 312. Such instructions may be read into the memory 312 from another computer-readable medium. Execution of the sequences of instructions contained in the memory 312 causes the processor 301 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 301 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 1501 for execution. For example, the instructions may initially be carried on a magnetic disk from a remote computer. Alternatively, a remote computer can load the instructions into its dynamic memory and send the instructions over the Internet 324. Specifically, the computer instructions may be downloaded into the memory 312 of the computerized system 300 from the foresaid remote computer via the Internet 324 using a variety of network data communication protocols well known in the art.

In one or more embodiments, the memory 312 of the computerized system 300 may store any of the following software programs, applications or modules:

1. Operating system (OS) 313 for implementing basic system services and managing various hardware components of the computerized system 300. Exemplary embodiments of the operating system 313 are well known to persons of skill in the art, and may include any now known or later developed mobile operating systems.

2. Applications 314 may include, for example, a set of software applications executed by the processor 301 of the computerized system 300, which cause the computerized system 300 to perform certain predetermined functions, such as display the graphical user interface(s) on the display device 311 or capture document images using the camera 326. In one or more embodiments, the applications 314 may include an inventive application 315 for clustering near-duplicate images described herein.

3. Data storage 321 may store, for example, various data structures 322 used in image clustering. In addition, the data storage 321 may include image files 323 of the documents to be clustered as well as index data 327.

In one or more embodiments, the inventive image clustering application 315 incorporates an image feature detection module 316 configured to detect image key points and describe them using image features. In addition, there may be provided a visual word vocabulary generation module 317 for generating the visual words vocabulary as described above. Yet additionally, there may be provided an inverted index generation module 318 for generating the inverted index as described above, counting visual words shared between images and sorting images based on decreasing shared visual word count. Additionally provided may be a geometric verification module 319 for performing geometric verification and determining a similarity measure between images. Finally, clustering module 320 may be provided to facilitate the clustering of the images based on the similarities measure.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for image clustering. It is intended that the specification and examples be considered as exemplary only, with a true scope and spirit of the invention being indicated by the following claims.

What is claimed is:

1. A computer-implemented method for clustering a plurality of images, the computer-implemented method being performed in connection with a computerized system comprising a central processing unit and a memory, the computer-implemented method comprising:
    a. generating a vocabulary of visual words in the plurality of images;
    b. extracting image features for image key points for each of the plurality of images;
    c. based on the extracted image features, creating an index pointing from the visual words in the vocabulary to images from the plurality of images, which contain these visual words;
    d. using the created index to collect all other images of the plurality of images that share at least one visual word with a selected image and determining a number of shared visual words;
    e. performing a geometric verification to verify whether the shared visual words are located at same locations in the selected image and the other images of the plurality of images and taking a fraction of verified shared visual words to all shared visual words as a similarity measure; and
    f. clustering the plurality of images hierarchically based on the similarity measure.

2. The computer-implemented method of claim 1, wherein the vocabulary of visual words is generated from a set of image features extracted from a collection of representative images.

3. The computer-implemented method of claim 2, wherein the collection of representative images comprises at least one million images.

4. The computer-implemented method of claim 1, wherein generating the vocabulary of visual words comprises clustering similar feature vectors and representing all feature vectors similar to each cluster centroid with a visual word and adding that visual word to the vocabulary of visual words for each cluster.

5. The computer-implemented method of claim 1, wherein the image features for image key points are extracted for the each of the plurality of images using a scale-invariant feature transform (SIFT).

6. The computer-implemented method of claim 1, wherein the index pointing from the visual words in the vocabulary to images from the plurality of images is an inverted index.

7. The computer-implemented method of claim 1, further comprising sorting the collected other images of the plurality of images that share at least one visual word with a selected image based on the number of the shared visual words.

8. The computer-implemented method of claim 7, further comprising selecting a predetermined number of the collected other images with top numbers of the shared visual words.

9. The computer-implemented method of claim 1, wherein performing the geometric verification comprises determining an affine transformation that maps at least a portion of the selected image to another image of the plurality of images.

10. The computer-implemented method of claim 1, wherein performing the geometric verification comprises determining a perspective transformation that maps at least a portion of the selected image to another image of the plurality of images.

11. The computer-implemented method of claim 1, further comprising verifying uniformity of distribution of the shared visual words over the other images and rejecting the other images with uniformity of distribution of the shared visual words below a predetermined threshold.

12. The computer-implemented method of claim 11, wherein the verifying uniformity of distribution of the shared visual words over the other images comprises dividing the other images into a coarse two-dimensional grid comprising a plurality of cells, and for each grid cell, determining a fraction of matching visual words to the total visual words in that cell, and performing a statistical test for sufficient uniformity of the distribution of the shared visual words among the grid cells.

13. The computer-implemented method of claim 1, wherein the clustering the plurality of images is performed using a modified complete-linkage agglomerative hierarchical clustering algorithm.

14. The computer-implemented method of claim 1, wherein the clustering the plurality of images is performed using a sparse distance matrix calculated based on the similarity measure.

15. A computerized system for clustering a plurality of images, the computerized system comprising a central processing unit and a memory storing a set of computer-executable instructions for:
    a. generating a vocabulary of visual words in the plurality of images;
    b. extracting image features for image key points for each of the plurality of images;
    c. based on the extracted image features, creating an index pointing from the visual words in the vocabulary to images from the plurality of images, which contain these visual words;
    d. using the created index to collect all other images of the plurality of images that share at least one visual word with a selected image and determining a number of shared visual words;
    e. performing a geometric verification to verify whether the shared visual words are located at same locations in the selected image and the other images of the plurality of images and taking a fraction of verified shared visual words to all shared visual words as a similarity measure; and
    f. clustering the plurality of images hierarchically based on the similarity measure.

16. The computerized system of claim 15, wherein the vocabulary of visual words is generated from a set of image features extracted from a collection of representative images.

17. The computerized system of claim 15, wherein the collection of representative images comprises at least one million images.

18. The computerized system of claim 15, wherein generating the vocabulary of visual words comprises clustering similar feature vectors and representing all feature vectors similar to each cluster centroid with a visual word and adding that visual word to the vocabulary of visual words for each cluster.

19. The computerized system of claim 15, wherein the image features for image key points are extracted for the each of the plurality of images using a scale-invariant feature transform (SIFT).

20. A non-transitory computer-readable medium embodying a set of computer-executable instructions, which, when executed in a computerized system comprising a central processing unit and a memory, cause the computerized system to perform a method for clustering a plurality of images, the method comprising:
   a. generating a vocabulary of visual words in the plurality of images;
   b. extracting image features for image key points for each of the plurality of images;
   c. based on the extracted image features, creating an index pointing from the visual words in the vocabulary to images from the plurality of images, which contain these visual words;
   d. using the created index to collect all other images of the plurality of images that share at least one visual word with a selected image and determining a number of shared visual words;
   e. performing a geometric verification to verify whether the shared visual words are located at same locations in the selected image and the other images of the plurality of images and taking a fraction of verified shared visual words to all shared visual words as a similarity measure; and
   f. clustering the plurality of images hierarchically based on the similarity measure.

21. A computer-implemented method for clustering a plurality of content items, the computer-implemented method being performed in connection with a computerized system comprising a central processing unit and a memory, the computer-implemented method comprising:
   a. generating a vocabulary of words in the plurality of content items;
   b. extracting features from the plurality of content items;
   c. based on the extracted features, creating an index pointing from the words in the vocabulary to content items from the plurality of content items, which contain these words;
   d. using the created index to collect all other content items of the plurality of content items that share at least one word with a selected content item and determining a number of shared words;
   e. performing a content verification to verify whether the shared words are located at same locations in the selected content item and the other content items of the plurality of content items and taking a fraction of verified shared words to all shared words as a similarity measure; and
   f. clustering the plurality of content items hierarchically based on the similarity measure.

22. The computer-implemented method of claim 21, wherein the content items in the plurality of content items are texts.

23. The computer-implemented method of claim 21, wherein the content items in the plurality of content items are audio recordings.

24. The computer-implemented method of claim 21, wherein the content items in the plurality of content items are videos.

* * * * *